United States Patent
Pederson

[15] 3,675,484
[45] July 11, 1972

[54] APPARATUS FOR TEMPERATURE MEASUREMENT

[72] Inventor: Arthur M. Pederson, Mercer Island, Wash.

[73] Assignee: The Battelle Development Corporation, Columbus, Ohio

[22] Filed: June 5, 1970

[21] Appl. No.: 43,827

[52] U.S. Cl. ..................73/362 AR, 73/170 A, 73/344, 331/66, 331/110, 331/141
[51] Int. Cl. ..................G01k 1/08, G01k 7/24, G01k 13/02
[58] Field of Search ..............73/170 A, 344, 362 R, 362 AR, 73/362 CP, 362 SC, 351, 339 R; 331/66, 141, 110

[56] References Cited

UNITED STATES PATENTS

| | | | |
|---|---|---|---|
| 3,144,619 | 8/1964 | Cochran | 331/110 X |
| 3,500,246 | 3/1970 | Werner | 331/141 X |
| 3,555,448 | 1/1971 | Clarke et al. | 331/141 X |
| 3,212,026 | 10/1965 | Julie | 331/141 |
| 3,512,408 | 5/1970 | Douglass | 73/326 R X |
| 2,999,121 | 9/1961 | Mead | 73/359 X |
| 3,098,993 | 7/1963 | Coop | 73/170 A X |
| 3,359,801 | 12/1967 | Rasmussen | 73/170 A X |

OTHER PUBLICATIONS

Lovborg, L., A Linear Temperature–to–Frequency Converter. In the Journal of Scientific Instruments, Vol. 42, 1965, pp. 611–614. Q–184–J7.

Silverman, G., Emitter Follower Enhances Oscillators Frequency Variation. In Electronics, Vol. 39, Dec. 26, 1966, pp. 73–74. TK–7800–E58.

*Primary Examiner*—Louis R. Prince
*Assistant Examiner*—Frederick Shoon
*Attorney*—Christensen & Sanborn

[57] ABSTRACT

An improved apparatus for temperature measurement which minimizes sensing element self-heating error and instrument ambient heating error when used as an oceanographic thermometer includes a frequency-selective network having a thermistor as a temperature sensing element thereof. The network is connected in the feedback loop of an AC amplifier whose output voltage is stabilized by an automatic gain control circuit at a predetermined, low value. In one embodiment, the output voltage is connected to the apparatus output terminal through an isolation circuit, and the AGC circuit comprises a second thermistor in shunt with the output voltage. In a second, improved embodiment, the output voltage is amplified by a second amplification stage and applied to a level detector circuit and to an isolation circuit from which the apparatus output is taken. The level detector in turn controls the impedance of a field effect transistor in shunt with the output voltage. The requirements for a successful oceanographic thermometer design are discussed and related in detail to the embodiments noted, and the performance of working models of each embodiment with regard to these requirements is set forth.

17 Claims, 4 Drawing Figures

INVENTOR.
ARTHUR M. PEDERSON
BY
Christensen Sanborn & Matthews
ATTORNEYS

INVENTOR.
ARTHUR M. PEDERSON
BY
Christensen Sanborn & Matthews
ATTORNEYS

3,675,484

APPARATUS FOR TEMPERATURE MEASUREMENT

BACKGROUND OF THE INVENTION

This invention generally relates to an apparatus for the measurement of temperature, and, more particularly, to an oceanographic thermometer.

It has long been desirable to make in-situ determinations of ocean temperatures for purposes of temperature profiling, underwater current monitoring, or the like. There have been developed-during the course of experience in making such determinations, a number of criteria for a successful oceanographic thermometer design. The instrument should be completely usable at varying depths underwater, and thus must be relatively compact so as to be placed within a pressure housing designed to withstand the expected range of pressures. The instrument also should be inexpensive due to the chance of loss. In order to have results which can be correlated, the instrument also must have long-term stability with errors occurring in a predictable and known manner, or within a predictable range, over the intended period of operation. In this regard, the instrument should be highly sensitive and yet stable so that minute differences in ocean temperature can be detected.

There must be relatively low power dissipation in the sensing element and in the entire instrument. With respect to the former requirement, heating of the sensing element by its measuring and bias signals introduces a self-heating error into the temperature determination. This self-heating error is undesirable because it is neither constant nor predictable, as heat transfer from the sensing element varies with changes in the ambient conditions, such as water flow rate or temperature. With respect to the latter requirement, heating of the ambient by the entire instrument introduces further error in temperature determination. In this regard, one approach to reducing ambient heating has been to minimize the on-time of the instrument by operating only during the period of time needed to make a temperature determination. With such a technique, a further requirement is introduced, as the instrument must come as rapidly as possible to a stable condition so that the temperature determination can be made.

The development of the oceanographic thermometer can be discussed conveniently in terms of the chronological development of the sensing element therefor. Perhaps the first such device was one using a mercury bulb as a sensing element. While these devices operated satisfactorily at moderate depths, they were unsuitable for most types of oceanographic research and in fact satisfied few of the requirements stated above.

A next set of instruments utilized a thermistor as the sensing element. The thermistor has many advantages, among which are high sensitivity, low cost, and fast response in temperature determinations. The major disadvantages of the thermistor as a sensing element are non-linearity, as the resistance value is exponentially related to the sensed temperature, and a poorer long-term stability than some of the sensing elements to be hereinafter discussed.

In the previous designs of instruments using a thermistor as the sensing element, there has been little or no attention paid to the problems of self-heating error or ambient heating error. In most of these designs, the thermistor has been placed in an AC or in a DC bridge so that changes in its resistance can be monitored by detecting changes in the balance point of the bridge.

In one design, a thermistor is placed in the water and connected to the remainder of the bridge elements and the electronics by a long cable extending to a suitable housing mounted on land or on a surface craft. This design, although avoiding the problem of ambient heating error, nevertheless fails to consider self-heating error and in addition introduces additional temperature-dependent errors due to the length of the connecting cables and the physical separation between the bridge elements.

In another design, a plurality of thermistors are disposed along the length of an underwater cable and are sequentially connected into the fourth leg of a DC bridge by a stepping switch. Because of the use of a DC bridge, resolution in temperature sensing, and thus sensitivity, is limited. Under conditions of oceanographic usage in which large variations in temperature are to be expected, high DC currents pass through the bridge thermistors, thereby causing large self-heating errors.

Another set of instruments have been those which use a platinum resistor as the sensing element. The platinum resistor is extremely stable. However, it is not very sensitive to small changes in sensed temperature, and therefore a very sophisticated electronics system must be used to compensate therefor. Devices incorporating platinum resistors have generally been usable underwater. However, they are generally very expensive and their over-all long-term stability is reduced because of the instability of the sophisticated electronics needed to make them sensitive. Finally, because of the large number of electronic components involved, ambient heating error has not been overcome.

Yet another approach has been to use a quartz crystal as a sensing element. Although these devices fulfill most requirements of oceanographic thermometers, they are very expensive, and in addition have relatively long time constants, on the order of 3-25 seconds, which make them unusable for rapidly measuring fluctuating temperatures.

More recently, an instrument has been developed which uses a thermistor in an AC bridge forming the frequency-sensitive part of a Wien-bridge oscillator, wherein the oscillator output frequency is directly related to the temperature being determined. While this device has been completely usable underwater, relatively inexpensive, very sensitive, and has good long-term stability, there has been little or no attention paid in its design to the problems of self-heating error and ambient heating error. Rather, the emphasis was on obtaining an output signal which is linearly related to temperature changes. As mentioned before, the resistance of a thermistor is exponentially, and thus non-linearly, related to temperature.

It is therefore an object of this invention to provide an improved oceanographic thermometer which is completely usable underwater, which is inexpensive, which has good long-term stability, and which is highly sensitive to small variations in temperature.

It is a further object of this invention to provide such an oceanographic thermometer which has a small amount of self-heating error and which produces a small amount of ambient heating.

It is yet a further object of this invention to provide a thermistor controlled Wien-bridge oscillator whose design minimizes both self-heating error and ambient heating error.

It is a broad object of this invention to provide an improved apparatus for in-situ temperature measurement.

SUMMARY OF THE INVENTION

These objects and others are achieved briefly, by providing an AC amplifier, a frequency sensitive network connected in the feedback loop thereof, the frequency sensitive network including a thermistor as one element thereof, and further including means for stabilizing the magnitude of the amplifier output voltage.

BRIEF DESCRIPTION OF THE DRAWINGS

For a complete understanding of the invention, together with further objects and advantages thereof, reference should be made to the following portion of the specification taken in conjunction with the accompanying drawings in which.

DESCRIPTION OF A PREFERRED EMBODIMENT

Figure 1:
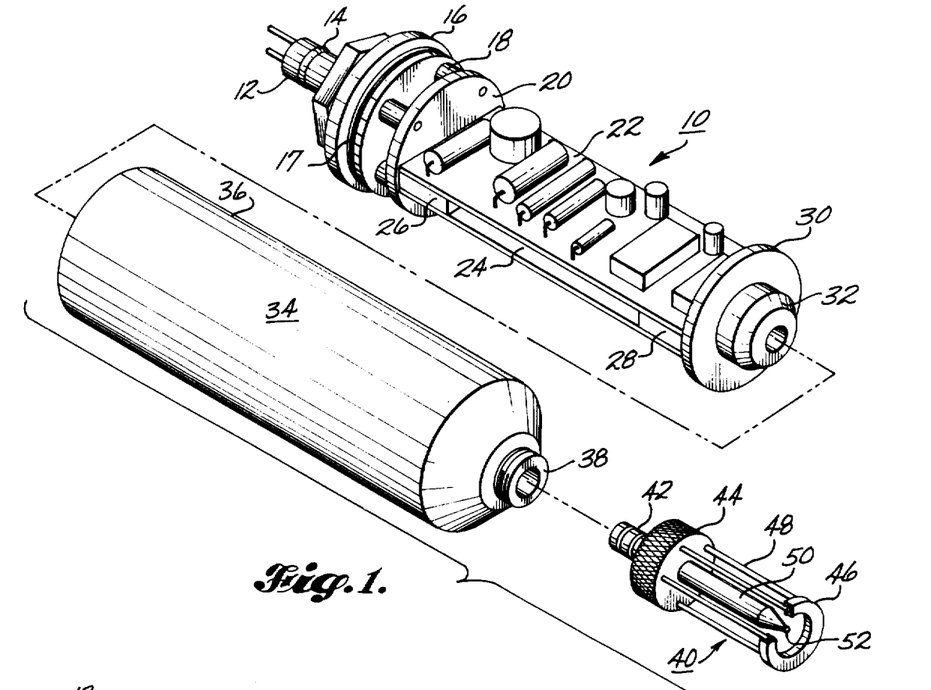
FIG. 1 is an exploded, pictorial view of one embodiment of the oceanographic thermometer.

Now referring to FIG. 1, the apparatus is completely contained within an assembly 10 which includes an underwater, male connector 12 through which power and output connections are made. Disposed on connector 12 is a sealing means including ridge 14 which slips into a corresponding groove of the interior of a receptacle into which connector 12 is placed. This receptacle may be located on an underwater research vehicle, in an assembly including a cable for obtaining vertical profiles of ocean temperatures, or the like. Connector 12 is attached to a cylindrical portion 16 of assembly 10 which in turn supports, by a plurality of spacers 18, a support 20. First and second printed circuit boards 22, 24 are separated from each other and attached at one end to support 20 by means of a spacer 26. Printed circuit boards 22 and 24 are likewise attached at the other end thereof to a second support 30 by means of a second spacer 28. Affixed to the end of support 30 is an electrical receptacle 32.

A pressure housing 34 is provided for assembly 10 and includes an elongated cylindrical portion 36 which, in assembly, slips over supports 30 and 20 and is fitted onto cylindrical portion 16. An O-ring 17 is provided at the point of engagement with cylindrical portion 16.

The printed circuit boards 22 and 24 within assembly 10 support thereon most of the electronic components and circuitry hereinafter described, with the exception of the sensing element or thermistor. In the embodiment of FIG. 1, the thermistor is disposed in a detachable probe 40 which includes an underwater connector 42 which is adapted for insertion into electrical receptacle 32 through a corresponding aperture 38 in housing 34. Disposed on the surface of connector 42 is an appropriate sealing means, not shown. Connector 42 is in turn affixed to a knurled portion 44 which supports thereon one end of a plurality of rods 48 whose other ends are terminated in a cylindrical portion 46. Knurled portion 44, cylindrical portion 46 and rods 48 form a case around a thermistor assembly 50 which is affixed at one end to portion 44 and which supports at the other end a glass bead 52 having disposed therein the thermistor. Electrical connections are made from the thermistor within bead 52 through assembly 50 to the electrical connector 42. In assembly, connector 42 of probe 40 is inserted through aperture 38 into underwater receptacle 32, and probe 40 is rotated by means of the knurled portion 44 until tight engagement is made between corresponding threaded portions of housing 34 and knurled portion 44.

The structure just described is designed to withstand pressures up to 5,000 p.s.i., is extremely compact, and permits rapid interchange of thermistors and replacement thereof by a fixed resistor for calibration. In addition, the thermistor is physically separated from the remainder of the electronics by a small distance so as to reduce somewhat ambient heating error. Of course, it will be realized by one skilled in the art that the physical design is not limited to the embodiment illustrated in FIG. 1, but is dictated by the particular environmental conditions in which the apparatus is to be used.

Figure 2:
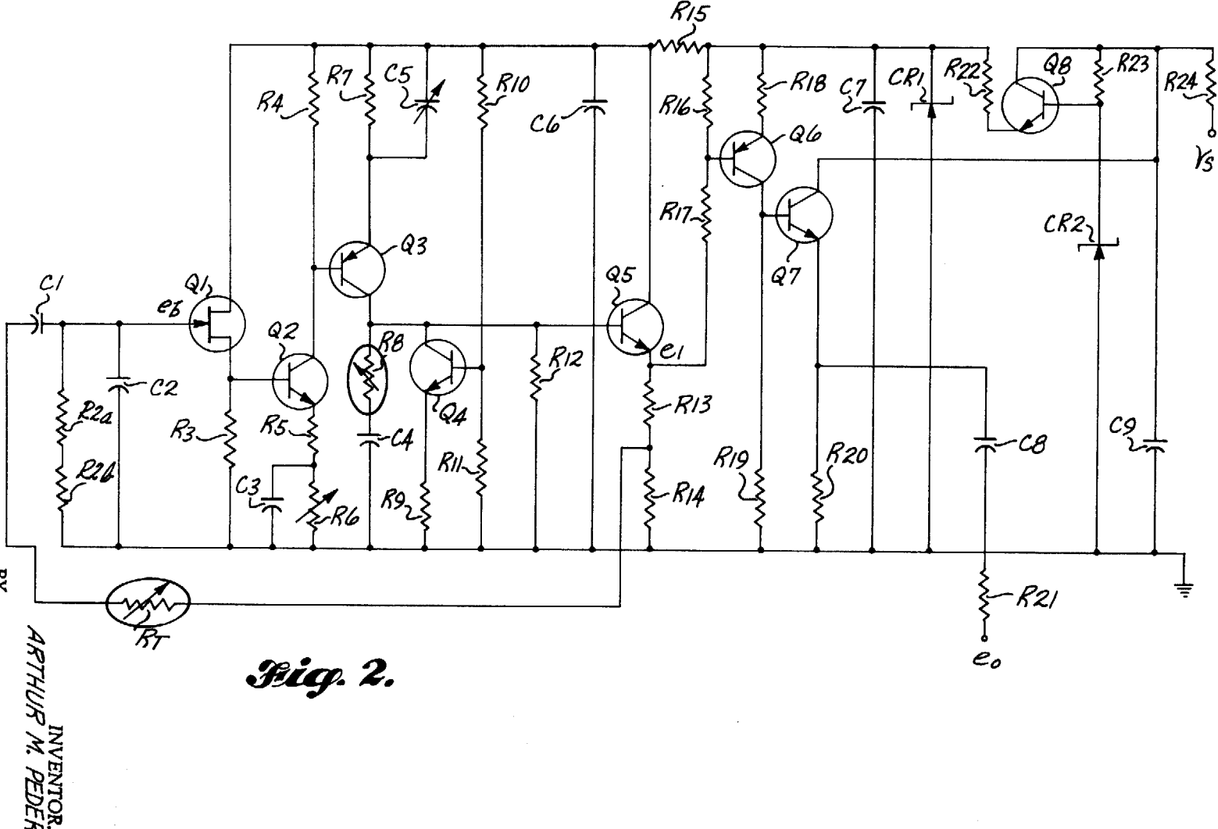
FIG. 2 is a schematic diagram of a first embodiment of the electronic circuitry thereof.

In FIG. 2, one embodiment of the electronic circuitry of the apparatus is illustrated which comprises an output-voltage stabilized AC amplifier, a frequency-selective network including the thermistor which is connected in a positive feedback configuration with the amplifier, an isolation circuit connected between the output of the amplifier and the instrument output, and a stabilized power supply. The frequency-selective network and the AC amplifier function as a Wien-bridge oscillator so that the output voltage from the amplifier has a frequency which is determined by the resistance of the thermistor within the frequency-selective network, and thus by the ambient temperature of the surrounding medium.

In more detail, the frequency-selective network includes a series connection of a thermistor RT and a capacitor C1 which provide a feedback current path from the output of the AC amplifier, hereinafter to be described, to the input terminal thereof which is represented in FIG. 2 by the gate electrode of a field-effect transistor Q1. The frequency-selective network also includes resistors R2a, R2b and a capacitor C2 connected in parallel between the input terminal of the amplifier and a source of reference or ground potential. As is well known with Wien-bridge oscillators, the output frequency thereof is determined by the balance frequency $f_o$ of the frequency-selective network. In FIG. 2, the balance frequency $f_o$ of the network varies with changes in the resistance value of thermistor RT and thus with changes in the temperature of the surrounding medium.

It will be appreciated that the input impedance of the amplifier, which is in parallel with the R2–C2 combination, and the output impedance of the amplifier, which is in series with the thermistor RT and capacitor C1, also comprise portions of the frequency-selective network. In the ideal Wien-bridge oscillator, the amplifier input impedance would be infinite and the amplifier output impedance would be zero so as to eliminate any effects thereof on the balance frequency $f_o$.

The design in FIG. 2 maintains the input impedance of the AC amplifier at a very high value by using field-effect transistor Q1 in the input circuit thereof. The drain electrode of transistor Q1 is connected to a regulated supply voltage through a filter including current limiting resistor R15 and a capacitor C6 and the source electrode thereof is connected to ground potential through a biasing resistor R3.

The signal appearing on the source electrode is coupled to the base of a transistor Q2 which forms one element of a first amplification stage. The emitter of transistor Q2 is connected to ground through a biasing circuit including the series connection of a resistor R5 and parallel-connected capacitor C3 and variable resistor R6. The collector of transistor Q2 is tied to the regulated supply voltage through a resistor R4 and to the base of a second transistor Q3. The emitter of transistor Q3 is tied to the regulated supply voltage through a resistor R7 and a parallel-connected, phase-adjusting variable capacitor C5. The signal appearing on the collector of transistor Q3 has a magnitude approximately equal to the output signal of the amplifier and is coupled directly to the transistor Q5 which is connected in an emitter-follower configuration, with the collector thereof tied directly to the regulated supply voltage and with its emitter tied to ground potential through the series combination of resistors R13 and R14. The signal that is fed back via the frequency-selective network including thermistor RT is taken from the common junction of resistors R13 and R14. The output signal of the amplifier, or an AC voltage $e_1$, appears on the emitter of Q5 and is fed to the isolation circuit hereinafter to be described.

As is well known, a criterion for oscillation is that the overall loop gain of the amplifier and the frequency-selective network must be greater than unity. To reduce self-heating error in the thermistor RT, it is also desirable that the output voltage $e_1$ of the amplifier, and thus the voltage applied across thermistor RT, have as low a value as possible. In order to maintain a loop gain greater than unity and yet to keep the output voltage $e_1$ as low as possible, an automatic gain control circuit is included in the amplifier to directly maintain the output voltage thereof at a predetermined value. In FIG. 2, this automatic gain control circuit includes a second thermistor R8 which is connected in series with a DC-blocking capacitor C4 from the collector of transistor Q3 to ground potential. Since the gain of an emitter-follower amplifier such as transistor Q5 is approximately unity, it can be seen that the signal appearing across thermistor R8 and capacitor C4 may be considered as the output voltage of the amplifier. Thermistor R8 acts as a variable impedance in shunt with the input to transistor Q5 so that the output voltage $e_1$ is stabilized at a predetermined value.

To accomplish this stabilization, the voltage produced by the first stage including transistors Q2 and Q3 must be sufficient to heat thermistor R8 so as to reduce its resistance significantly from its nominal value to a value where a stable balance is achieved, and this voltage magnitude determines the amount of self-heating error in the instrument.

A transistor Q4 is also connected in shunt with the automatic gain control circuit and with the input of transistor Q5. The collector of transistor Q4 is connected to the collector of transistor Q3 and the emitter thereof to ground potential through a resistor R9. Bias on the base is established by a voltage divider including resistors R10 and R11 connected between the regulated supply voltage and ground potential. In operation, transistor Q4 acts as a current sink to establish an operating point and load line for transistor Q3 so that it operates undistorted through expected swings of the output voltage magnitude.

At the balance frequency where the input signal $e_b$ to the amplifier is in phase with the output signal $e_1$ therefrom, the combination of the amplifier and the frequency-selective network will oscillate, provided that the amplifier has sufficient gain to satisfy the criterion noted above. This frequency may be expressed as follows:

$$f_o = 1/(2\pi(R1R2C1C2)^{1/2}) \quad (1)$$

where, $R1 = R_o + RT$.

In the ideal case, the amplifier including transistors Q1–Q5 would have zero phase shift over the frequency range of the instrument, would have an infinite input impedance $Z_{in}$ and a zero output impedance $R_o$. However, the amplifiers are not ideal. Therefore, capacitor C5 is provided to tune-out the residual phase shift in the amplifier. In addition, the input field effect transistor Q1 provides a relatively high input impedance, compared with the impedance of frequency-selective network components R2 and C2. Finally, the use of an emitter-follower amplifier Q5, in series with precision resistors R13 and R14, provides a low and essentially constant output impedance.

The isolation stage includes transistors Q6 and Q7. The output voltage $e_1$ from the amplifier is coupled by a voltage divider network including resistors R16 and R17 to the base of transistor Q6. It will be noted that resistor R16 and the emitter resistor R19 of transistor Q6 are connected directly to the regulated supply voltage, rather than through limiting resistor R15. The collector of transistor Q6 is connected to the base of transistor Q7 and to ground potential through a biasing resistor R19. Transistor Q7 is connected as an emitter-follower, with its collector tied directly to the unregulated supply voltage and its emitter to the instrument output terminal through a coupling capacitor C8 and a limiting resistor R21. Biasing is provided by a resistor R20 connected between the emitter of transistor Q7 and ground potential.

The signal $e_o$ appearing on the output terminal has a diminished magnitude from the voltage $e_1$ appearing on the amplifier output, but the frequency of $e_o$ is equal to the frequency of $e_1$. The prime function of the isolation circuit including transistors Q6 and Q7 is to block changes in the impedance of the load connected to the instrument output terminal from appearing as impedance changes at the output of transistor Q5. Such changes would modify the output impedance $R_o$ of the amplifier and thus introduce errors into the temperature determination.

The remainder of the circuitry in FIG. 2 comprises a regulated power supply which functions to stabilize the supply voltage for the transistors Q1–Q5. A supply voltage $V_s$ is supplied through a limiting resistor R24 to the collector of transistor Q7 and to the collector of a regulating transistor Q8. Capacitor C9 connected from the common junction of resistor R24 and the collectors of transistors Q7 and Q8 to ground potential provides a rough filtering of the supply voltage $V_s$. Regulation, however, is provided by transistor Q8 whose base is connected to the common junction of a resistor R23 and a voltage regulating diode CR2 which is connected between the collector of transistor Q8 and ground potential. The output of regulating transistor Q8, which appears on the emitter thereof, is roughly stabilized at the operating point of the regulating diode CR2, which may comprise a zener diode. This output is supplied through a resistor R22 to one terminal of a second regulating diode CR1 which is connected to ground potential. Capacitor C7 is connected in parallel with regulating diode CR1 and the voltage thereacross is finely regulated at the operating point of regulating diode CR1 to appear as the regulated supply voltage heretofore mentioned.

A working model of the embodiment in FIG. 2 was constructed and the component values used therein were as follows:

TABLE I

| Component | Value |
|---|---|
| Q1 | 2N3823 |
| Q2 | 2N2484 |
| Q3 | 2N3799 |
| Q4 | 2N2484 |
| Q5 | 2N2484 |
| Q6 | 2N3799 |
| Q7 | 2N2484 |
| Q8 | 2N2102 |
| C1 | 2–910pf in parallel, Vitramon VY series, low temperature coefficient capacitors |
| C2 | 2–910pf in parallel, Vitramon VY series, low temperature coefficient capacitors |
| RT | Veco Z32A91, or Z32A58, 6k–2k within temperature range of interest |
| R2a | 2k deposited carbon, precision |
| R2b | 20k zero temperature coefficient, precision |
| R3 | 10k |
| R4 | 1.21k, precision |
| R5 | 274 Ω, precision |
| R6 | 2k adjustable, precision |
| R7 | 150Ω, precision |
| R8 | Fenwall BA44V1 |
| R9 | 100Ω, precision |
| R10 | 0.09k, precision |
| R11 | 806Ω, precision |
| R12 | 2k, precision |
| R13 | 4.02k, precision |
| R14 | 453, precision |
| R15 | 10Ω |
| R16 | 10k |
| R17 | 10k |
| R18 | 1k |
| R19 | 1k |
| R20 | 1k |
| R21 | 1k |
| R22 | 200Ω, precision |
| R23 | 2.49k, precision |
| R24 | 10Ω |
| C3 | 120 mf |
| C4 | 39 mf |
| C5 | 330 pf, trimming mica |
| C6 | 39 mf |
| C7 | 22 mf |
| C8 | 0.22 mf |
| C9 | 22 mf |
| $V_s$ | 20–30 VDC |
| CR1 | N943 |
| CR2 | 1N4110 |

Figure 3:
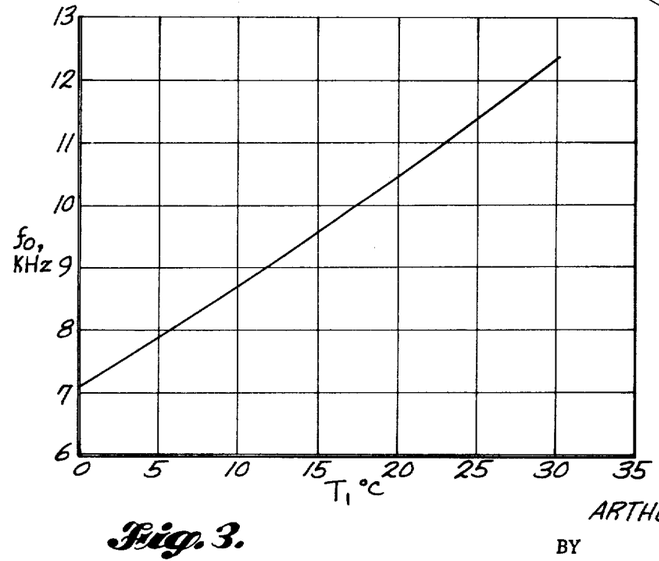
FIG. 3 is a graph illustrating the relationship between the thermometer's output frequency and the temperature measured thereby.

Under experimental operation, the frequency of oscillation $f_o$ ranged from approximately 7KHz at 0° C. to approximately 12.5KHz at 30° C., as seen from the chart in FIG. 3. The output impedance at the emitter of transistor Q5 was less than 25Ω and a calculated value of the output impedance $R_o$ was approximately 407Ω. It was shown that change in the output impedance of Q5 of 10Ω would result in a change of $R_o$ by only 0.1Ω. Thus, the output impedance $R_o$ was constant and low with respect to the 6k—2k range of RT.

The input transistor Q1 had an input impedance of $Z_{in} = $ 90MΩ in parallel with approximately 3 pf. Since 90MΩ is $>>R2 = 22k\Omega$, and 3 pf is $<<$ than C2 = 1820 pf, changes in $Z_{in}$ caused very small changes in the frequency $f_o$.

The minimum gain for the AC amplifier can be calculated as follows. The amplitude of the input signal $e_b$ is found from $$e_b = R2C1e_{T/}(R1C1 + R2C2 + R2C1) \quad (2)$$

where $e_T$ is the Thevenin equivalent of $e_1$, as seen from the common junction of resistors $R13$ and $R14$, and is given by $$e_T = R14e_1/(R13 + R14) \quad (3)$$

With the resistance values given in Table I, $e_T$ is approximately equal to 0.1 $e_1$. The effective signal which drives the bridge can be seen from relation (2) to be $e_T$. Since $C1 = C2$, equation (2) reduces to $$e_b = R2e_T/(R1 + 2R2) \quad (4)$$

Since $R2 = 22k$ is greater than $R1 \approx 4k$, $e_b$ is thus approximately equal to one-half of $e_T$. Therefore, the gain of the AC amplifier must be at least 2 to insure the unity loop gain required for oscillation.

The criteria for choosing $e_T$ is essentially that for choosing $e_1$ since the two are related by a constant and since $e_1$ is determined by the magnitude of the voltage needed to significantly reduce the resistance of AGC thermistor R8. With the Fenwall thermistor in Table I, a desired value for $e_1$ is 5 volts peak-to-peak. Knowing this value, the first amplification stage including transistors Q2 and Q3 can be designated to provide a stable and linear gain of at least 2.

With the output voltage $e_1$ of 5 volts peak-to-peak previously demonstrated, the power dissipation in the thermistor RT may be found, from straight forward calculations, to be 0.3 microwatts at $RT = 2k$ and 0.33 microwatts at $RT = 6k$. From the data sheets of the manufacturer, this power dissipation causes approximately 0.0004° C. self-heating error in still water.

Therefore, a relatively small, stabilized value of the output voltage reduces the self-heating error to a very acceptable limit.

To insure long-term stability, the frequency-selective network components were all temperature compensated. That is, capacitors C1 and C2 comprised low temperature coefficient capacitors. Resistor R2a comprised a deposited carbon resistor whose temperature coefficient compensated for those of C1 and C2 and R2b comprised a zero temperature coefficient resistor.

Now considering the power supply, the operating voltage was well regulated at approximately 11.5 volts and a 1 volt change in the supply voltage $V_s$ caused less than 0.1Hz change in $f_o$. The total power dissipated by the apparatus was 660Mw. Although an accurate calculation of ambient heating error resulting from the power dissipation cannot be made, it can be estimated that the result would be a fluctuating error in frequency $f_o$ of approximately 0.5° C. maximum.

Figure 4:
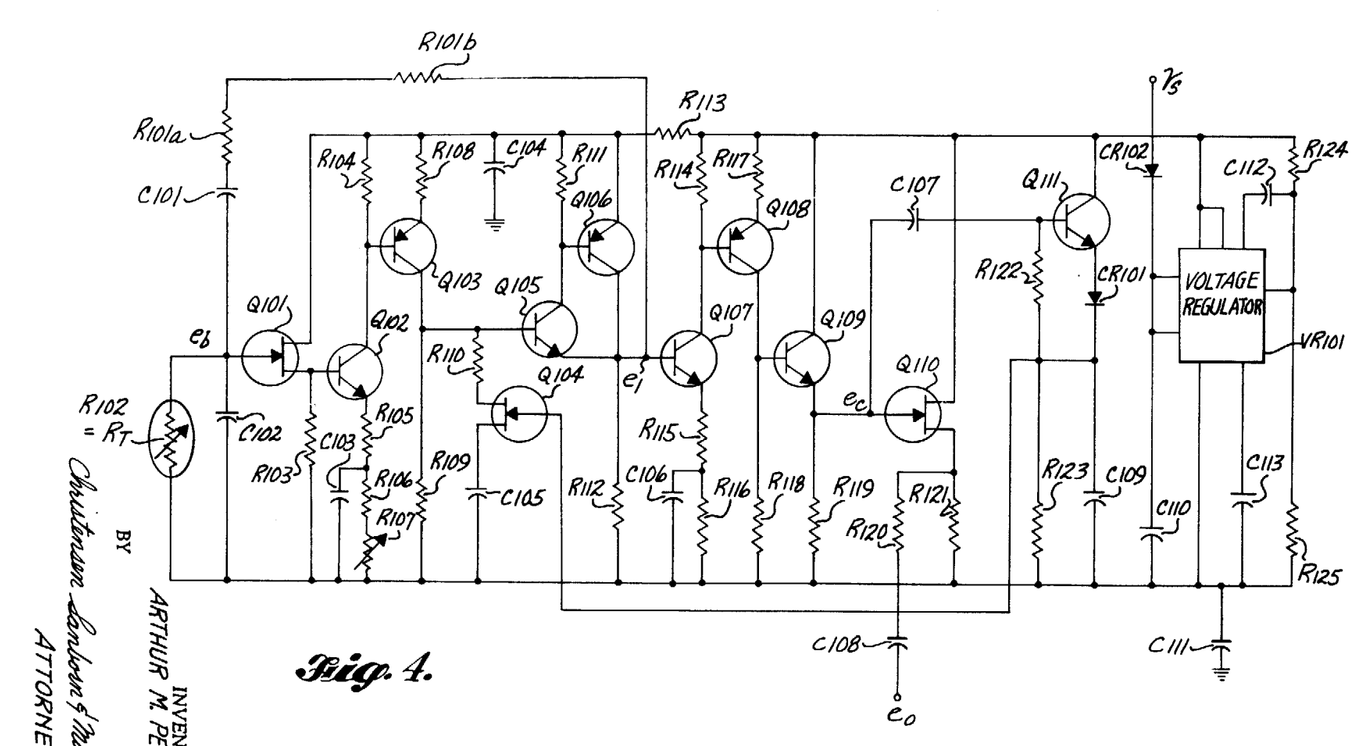
FIG. 4 is a schematic diagram of a second embodiment of the electronic circuitry.

To further reduce the self-heating error and the ambient heating error obtained with the circuit of FIG. 2, the embodiment of FIG. 4 was developed. Since this embodiment uses the same functional elements as that of FIG. 2, only the differences will be discussed in detail.

The design in FIG. 4 is advantageous over that in FIG. 2 in that the amount of power dissipated in the sensing thermistor RT and the amount of power dissipated by the entire electronics circuit is less, thereby further reducing self-heating and ambient heating errors, and in that the circuit comes much more rapidly to a stable condition after turn-on, thereby allowing a reduced duty cycle for temperature determinations and further reducing ambient heating error.

The frequency-selective network comprises the series connection of a capacitor C101 and two resistors R101a and R101b connected from the amplifier output, hereinafter to be described, to its input terminal, as represented by the gate electrode of a field effect transistor Q101. The thermistor RT is now connected in parallel with capacitor C102 from the gate electrode of Q101 to reference or ground potential. By thus placing the thermistor RT in the parallel portion of the network connected across the input of the amplifier, several important results follow. First, the parallel resistance which corresponds to the resistance of R2 of FIG. 2, is reduced, increasing the disparity of its value from the input impedance of the field effect transistor Q101. Second, the thermistor is taken out of the series feedback connection and thus power dissipation therein is further reduced below the design of FIG. 2, in which all the feedback current passes directly through the thermistor. Third, any changes in the frequency $f_o$ due to small changes in the parasitic capacitance existing in the connections between the thermistor and the amplifier are reduced, as one side of the thermistor is now grounded.

The output from field effect transistor Q101 is passed through a first amplification stage comprising transistors Q102 and Q103 to the base electrode of a transistor Q105 which is connected in an emitter-follower configuration. As with the circuit of FIG. 2, the signal on the emitter of Q103 has a magnitude approximately equal to the amplifier output $e_1$ appearing on the emitter of Q105. However, the automatic gain control circuit has been replaced by a variable impedance network comprising a resistor R110, a field effect transistor Q104, and a DC-blocking capacitor C105. The impedance of transistor Q104 is in turn controlled by a signal applied to its base electrode which is obtained from a level detector circuit hereinafter to be described.

A very low output impedance at the emitter of transistor Q105 is obtained by connecting a second transistor Q106 in circuit therewith. Specifically, the collector of transistor Q105 is connected to the regulated supply voltage through a resistor R111 and to the base electrode of transistor Q106. The emitter of transistor Q106 is connected directly to the regulated supply voltage and the collector thereof is connected to the emitter of transistor Q105. Thus, the configuration in FIG. 4 has the required high input impedance and very low output impedance for stable operation.

The output voltage $e_1$ appearing at the emitter of transistor Q105 is applied through a second amplification stage comprising transistors Q107, Q108, and Q109 to the gate electrode of an isolating field effect transistor Q110. The signal appearing thereon is $e_c$ and is also applied by a capacitor C107 to the base electrode of a transistor Q111 which forms one part of the level detector circuit.

The drain electrode of transistor Q110 is connected directly to the regulated supply voltage and the source electrode thereof is connected to reference potential by a resistor R121 and to the output terminal of the instrument by a resistor R120 and a capacitor C108. As will be noted shortly, the required gain of the amplifier in the embodiment of FIG. 4 is less than that in the embodiment of FIG. 2. Therefore, self-heating error can be further reduced. Large amplification of the output signal $e_1$ is made outside of the oscillator loop by means of the second amplification stage including transistors Q107–Q109.

The level detector circuit includes the aforementioned transistor Q111 whose collector is connected directly to the regulated supply voltage and whose emitter is connected through a diode CR101 to a common junction of a resistor R122, resistor R123 and a capacitor C109. The other end of resistor R122 is connected to the base of transistor Q111, and the other ends of resistor R123 and capacitor C109 are connected directly to ground potential. The common junction thereof is connected directly to the gate electrode of the field effect transistor Q104.

The function of this level detector and its operation is described in detail in Colwell et al, "A Low-Cost, General-Purpose Oscillator with Low Distortion and High Stability," *Hewlett-Packard Journal*, pages 12–14 (1968). In summary, a control voltage is applied to the gate electrode of transistor Q104 whenever the voltage $e_c$ differs from the forward voltage of the diode CR101 plus the base-to-emitter voltage drop of transistor Q111. Since the voltage $e_c$ is an amplified version of the output voltage $e_t$, it can be seen that the circuit of FIG. 4 provides very precise output voltage control at the preselected value. When $e_t$, and thus $e_c$, departs from the preselected value, a voltage is supplied to transistor Q104 to adjust its effective impedance either up or down in accordance with the sense of the error. Accordingly, the network including resistor R110 and transistor Q104 shunts more or less current from transistor Q105 to effect a desired change in the voltage $e_t$ appearing at the emitter thereof.

Most important, this type of level detector and automatic gain control circuit operates with a much smaller voltage $e_t$ than was the case with the circuit of FIG. 2, since it is not now required to provide a large AC voltage across the thermistor R8 in order to obtain automatic gain control. As the driving voltage for the frequency-selective network can be further reduced, the power dissipated in the thermistor and thus the self-heating error is also reduced.

In addition, the automatic gain control circuit of FIG. 2 requires several seconds before the resistance of thermistor R8 has decreased to a regulating value. On the other hand, the operation of the circuit in FIG. 4 is practically instantaneous so that the gain of the amplifier is stabilized in a much shorter time.

The regulated power supply in FIG. 4 comprises an integrated circuit voltage regulator VR101 to which the voltage supply $V_s$ is coupled through an input network comprising a diode CR102 and a capacitor C110. The voltage regulator VR101 is referenced to ground potential and supplies its regulated output voltage directly to the collector of transistor Q111 and the succeeding circuitry of the instrument. The output voltage is monitored in turn by a voltage divider including resistors R124 and R125 whose common junction is directly coupled to the input of voltage regulator VR101. The device VR101 is a commercially-available National Semiconductor LM350 model and reference should be made to specification sheets therefor for a description of the circuitry within. Capacitors C112 and C113 function as filters.

A working model of the instrument embodied in FIG. 4 was also constructed, and the component values used therein were as follows:

TABLE II

| Component | Value |
|---|---|
| Q101 | 2N5486 |
| Q102 | 2N2484 |
| Q103 | 2N3799 |
| Q104 | 2N5486 |
| Q104 | 2N5210 |
| Q106 | 2N5087 |
| Q107 | 2N5210 |
| Q108 | 2N5087 |
| Q109 | 2N5210 |
| Q110 | 2N5486 |
| Q111 | 2N5210 |
| C101 | 6800pf, Vitramon VY series, low temperature coefficient capacitor |
| R101a | 1.45k, precision, zero temperature coefficient |
| R101b | 549Ω, deposited carbon, precision |
| C102 | 6800pf, Vitramon VY series, low temperature coefficient capacitor |
| RT | Veco Z32A91 or Z32A58, 6k-2k within temperature range of interest |
| R103 | 10k, precision |
| R104 | 1.5k, precision |
| R105 | 698Ω, precision |
| R106 | 0Ω |
| R107 | 2k, adjustable, precision |
| R108 | 1 k, precision |
| R109 | 4.02k, precision |
| R110 | 1k |
| R111 | 4.99k, precision |
| R112 | 10k, precision |
| R113 | 10Ω |
| R114 | 4.99Ω, precision |
| R115 | 1k, precision |
| R116 | 9.09k, precision |
| R117 | 2k, precision |
| R118 | 10k, precision |
| R119 | 10k, precision |
| R120 | 1k |
| R121 | 4.7k |
| R122 | 10k |
| R123 | 15k |
| R124 | 12k, precision |
| R125 | 2.49k, precision |
| C103 | 180 mf |
| C104 | 68 mf |
| C105 | 39 mf |
| C106 | 39 mf |
| C107 | 0.022 mf |
| C108 | 0.22 mf |
| C109 | 10 mf |
| C110 | 10 mf |
| C111 | .01 mf |
| C112 | 47 pf |
| C113 | 10 mf |
| CR101 | 1N4154 |
| CR102 | 1N270 |
| $V_s$ | 15 vdc, unregulated |

With these component values, the input impedance of the amplifier, as represented by the input impedance of field effect transistor Q101, was again large. The measured output impedance $R_o$ appearing at the emitter of transistor Q105 was less than 1Ω. As before, the magnitude of the voltage $e_1$ is determined by the magnitude of voltage needed to operate the level detector circuit. The second amplification stage changes $e_t$ into the voltage $e_c$. If the transistor Q111 and the diode CR101 are composed of silicon, the forward drops thereof are approximately 0.6 volt each. Therefore, the value of voltage $e_r$ is regulated at approximately twice the sum of these voltage drops, or, 2.4 volts. If the voltage gain of the second amplification stage is approximately 25, the voltage $e_t$ is regulated at approximately 0.1 volt peak-to-peak.

With suitable calculations, it was ascertained that the power dissipated in the thermistor RT was 0.07 microwatts and 0.04 microwatts for $RT = 2k\Omega$ and $6k\Omega$, respectively. From the manufacturer's data tables, these power dissipations result in a self-heating error less than 0.0001° C. in still water.

In the working model, the total power dissipated by the instrument was approximately 100 Mw, which is a substantial reduction over the 660 Mw required for the embodiment of FIG. 2. In addition, because of the short-term stability of the automatic gain control circuit, the duty cycle or on-time of the instrument required for a particular temperature determination was further reduced, resulting in another reduction of ambient heating error.

While this invention has been described in terms of an oceanographic thermometer, in which context the invention was made, it should be evident to one skilled in the art of temperature measurement that the structure and functions described have broad applicability to situations in which self-heating error and ambient heating error may be a problem, and in which sensitive and stable operation is an essential. Therefore, the limits of this invention are to be measured only with reference to the following claims.

I claim:

1. An apparatus for the measurement of temperature comprising:
    a. a frequency-selective network which comprises a parallel branch and a series branch, said series branch including a resistance and a capacitance in series, and said parallel branch including a second resistance and a second capacitance in parallel, one of said resistances comprising a temperature-dependent resistor,
    b. a source of supply voltage,
    c. an AC amplifier having input, output, supply and reference terminals, said source of supply voltage being connected across said supply and said reference terminals, said parallel branch being connected from said input terminal to said reference terminal, and said series branch being connected from said output terminal to said input terminal, said AC amplifier having a gain sufficient to insure oscillation thereof in combination with said frequency-selective network to produce an output voltage on said output terminal whose frequency is determined by the temperature of said temperature-dependent resistor, said AC amplifier further including an input circuit connected between said input and said reference terminals, the impedance of said input circuit being high so that the input impedance of said AC amplifier is relatively high when compared with the impedance of said parallel branch of said frequency-selective network and an output circuit connected between said output and said reference terminals thereof for providing a relatively low output impedance with respect to the impedance of said series branch of said frequency-selective network, and
    d. means connected between said output and said reference terminals for stabilizing said output voltage on said output terminal at a predetermined low level being just sufficient to maintain the overall loop gain of said frequency-selective network and said AC amplifier greater than unity.

2. An apparatus for the measurement of temperature as recited in claim 1, wherein said input circuit includes a field-effect transistor so that the input impedance of said AC amplifier is relatively high when compared with the impedance of said parallel branch of said frequency-selective network.

3. An apparatus for the measurement of temperature, as recited in claim 1, wherein said output circuit comprises
a transistor connected in an emitter-follower configuration, said transistor having an input, and a voltage divider network in circuit therewith, said voltage divider network comprising two series-connected resistors which are connected from the emitter of said transistor to said amplifier's reference terminal, the common junction of said resistors functioning as said amplifier's output terminal, and
means coupling said amplifier's input terminal to said transistor input.

4. An apparatus for the measurement of temperature, as recited in claim 3, wherein:
a. said AC amplifier further includes an amplification stage having an input and an output, said input being coupled to said amplifier's input terminal and said output being coupled to the input of said transistor, and
b. said stabilizing means comprises a second temperature dependent resistor which is coupled between said transistor input and said amplifier's reference terminal.

5. An apparatus for the measurement of temperature, as recited in claim 3, wherein:
a. said AC amplifier further includes an amplification stage having an input and an output, said input being coupled to said amplifier's input terminal and said output being coupled to the input of said transistor, and
b. said stabilizing means comprises:
i. a level detecting means having said output voltage on said amplifier's output terminal coupled thereto, said level detecting means including a source of a standard voltage, and means comparing said output voltage with said standard voltage to produce a control signal whose magnitude and sense are determined by their difference,
ii. a controllable variable impedance which is coupled between said transistor input and said amplifier's reference terminal, said controllable variable impedance including a control terminal, and
iii. means coupling said control signal to said control terminal, whereby said output voltage is regulated at a value determined by said standard voltage.

6. An apparatus for the measurement of temperature, as recited in claim 5, and further including a second AC amplifier, said second amplifier also including input, output, supply and reference terminals, said source of supply voltage being connected across its supply and reference terminals, said second amplifier's input terminal being connected to said first amplifier's output terminal, and said second amplifier's output terminal being coupled to said level detecting means.

7. An apparatus for the measurement of temperature, as recited in claim 1, wherein said output circuit further includes
a first transistor connected in an emitter-follower configuration, and further comprising a second transistor in circuit with said first transistor, each transistor having a base, a collector, and an emitter, the emitter of said first transistor being said amplifier's output terminal, the base of said second transistor being tied to the collector of said first transistor, the collector of said second transistor being tied to the emitter of said first transistor, and the emitter of said second transistor being tied to said amplifier's supply terminal, and
means coupling said amplifier's input terminal to the base of said first transistor.

8. An apparatus for the measurement of temperature, as recited in claim 7, wherein:
a. said AC amplifier further includes an amplification stage having an input and an output, said input being coupled to said amplifier's input terminal, and said output being coupled to the base of said first transistor, and
b. said stabilizing means comprises:
i. a level detecting means having said output voltage on said amplifier's output terminal coupled thereto, said level detecting means including a source of standard voltage, and means comparing said output voltage with said standard voltage to produce a control signal whose magnitude and sense are determined by their difference,
ii. a controllable variable impedance which is coupled between the base of said first transistor and said amplifier's reference terminal, said controllable variable impedance including a control terminal, and
iii. means coupling said control signal to said control terminal, whereby said output voltage is regulated at a value determined by said standard voltage.

9. An apparatus for the measurement of temperature, as recited in claim 8, wherein said controllable variable impedance comprises a field-effect transistor having a gate terminal, said control signal being coupled to said gate terminal.

10. An apparatus for the measurement of temperature, as recited in claim 8, and further including a second AC amplifier, said second amplifier also including input, output, supply and reference terminals, said source of supply voltage being connected across its supply and reference terminals, said second amplifier's input terminal being connected to said first amplifier's output terminal and said second second amplifier's output terminal being coupled to said level detecting means.

11. An apparatus for the measurement of temperature, as recited in claim 10, and further comprising an isolation means having an input terminal which is connected to said second amplifier's output terminal and having a circuit output terminal, said isolation means including a field-effect transistor interposed between said input terminal and said circuit output terminal thereof which blocks impedance changes occurring at said circuit output terminal from occurring at said output terminal of said second amplifier.

12. An apparatus for the measurement of temperature, as recited in claim 1, further comprising an isolation means having said output voltage on said amplifier's output terminal connected thereto, said isolation means including a circuit output terminal, and means coupling said amplifier's output terminal to said circuit output terminal which blocks changes in impedance appearing at said circuit output terminal from appearing at said amplifier's output terminal.

13. An apparatus for the measurement of temperature, as recited in claim 1, wherein said temperature-dependent resistor is located in said series branch of said frequency-selective network.

14. An apparatus for the measurement of temperature, as recited in claim 1 wherein said temperature-dependent resistor is located in said parallel branch of said frequency-selective network.

15. An oceanographic thermometer for providing in-situ measurements of the temperature of sea water, comprising an apparatus as recited in claim 1, and further comprising:
a. a waterproof, pressure-proof housing,
b. means supporting said temperature-dependent resistor from said housing and in fluid contact with the sea water,
c. means maintaining the remaining portion of said frequency-selective network, said AC amplifier, and said stabilizing means within said housing, and
d. underwater connector means providing for connection of said amplifier's output, supply and reference terminals to an external monitoring means and to said source of supply voltage, respectively.

16. An oceanographic thermometer as recited in claim 15, further including a voltage regulating means interposed between said underwater connector means and said supply and reference terminals of said AC amplifier.

17. An oceanographic thermometer as recited in claim 15 wherein said means supporting said temperature-dependent resistor includes an underwater female receptacle disposed on said housing, a probe structure having said temperature-dependent resistor disposed therein, and an underwater male connector attached to said probe structure which is adapted for water-tight engagement with said female receptacle.

* * * * *